(12) United States Patent
Ochiai

(10) Patent No.: US 11,823,827 B2
(45) Date of Patent: Nov. 21, 2023

(54) INDUCTOR CORE, ELECTRONIC PEN CORE PORTION, ELECTRONIC PEN, AND INPUT DEVICE

(71) Applicant: KYOCERA Corporation, Kyoto (JP)

(72) Inventor: Hitomi Ochiai, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 657 days.

(21) Appl. No.: 17/041,952

(22) PCT Filed: Apr. 1, 2019

(86) PCT No.: PCT/JP2019/014540
§ 371 (c)(1),
(2) Date: Sep. 25, 2020

(87) PCT Pub. No.: WO2019/189937
PCT Pub. Date: Oct. 3, 2019

(65) Prior Publication Data
US 2021/0193361 A1 Jun. 24, 2021

(30) Foreign Application Priority Data
Mar. 30, 2018 (JP) .................................. 2018-069858

(51) Int. Cl.
*H01F 27/255* (2006.01)
*G06F 3/0354* (2013.01)
*H01F 3/08* (2006.01)
*H01F 17/04* (2006.01)

(52) U.S. Cl.
CPC ....... *H01F 27/255* (2013.01); *G06F 3/03545* (2013.01); *H01F 3/08* (2013.01); *H01F 17/045* (2013.01); *Y10T 428/32* (2015.01)

(58) Field of Classification Search
None
See application file for complete search history.

(56) References Cited

U.S. PATENT DOCUMENTS

2016/0349865 A1* 12/2016 Arai ........................... G06F 3/03
2017/0357340 A1* 12/2017 Kamiyama ............. G06F 3/046
2019/0025951 A1* 1/2019 Kamiyama .............. B43K 7/12
(Continued)

FOREIGN PATENT DOCUMENTS

EP 3447615 A1 2/2019
WO 2017/183526 A1 10/2017

*Primary Examiner* — Kevin M Bernatz
(74) *Attorney, Agent, or Firm* — Procopio, Cory, Hargreaves & Savitch LLP

(57) ABSTRACT

An inductor core includes: a tubular magnetic material body formed of a magnetic material, including pores. The tubular magnetic material body includes an inclined portion including an inclined surface which constitutes a peripheral surface of a truncated cone; and a straight trunk portion which is disposed coaxially with the inclined portion, includes an outer peripheral surface which constitutes a peripheral surface of a cylindrical body, and is connected with the inclined portion. A difference between an average value of distances between centers of gravity of the pores in the inclined portion and an average diameter of the pores in the inclined portion, is smaller than a difference between an average value of distances between centers of gravity of the pores in the straight trunk portion and an average diameter of the pores in the straight trunk portion.

12 Claims, 9 Drawing Sheets

(56) References Cited

U.S. PATENT DOCUMENTS

| | | | |
|---|---|---|---|
| 2019/0179434 A1* | 6/2019 | Tanaka | G06F 3/046 |
| 2019/0250726 A1* | 8/2019 | Yamada | H01F 27/004 |
| 2020/0142507 A1* | 5/2020 | Hara | G06F 3/03545 |
| 2021/0011564 A1* | 1/2021 | Ochiai | G06F 3/03545 |
| 2022/0375673 A1* | 11/2022 | Ochiai | G06F 3/046 |

\* cited by examiner

INDUCTOR CORE, ELECTRONIC PEN CORE PORTION, ELECTRONIC PEN, AND INPUT DEVICE

CROSS-REFERENCE TO RELATED APPLICATIONS

This application is a national stage entry according to 35 U.S.C. 371 of International Application No. PCT/JP2019/014540 filed on Apr. 1, 2019, which claims priority to Japanese Patent Application No. 2018-069858 filed on Mar. 30, 2018, the contents of which are entirely incorporated herein by reference.

TECHNICAL FIELD

The present disclosure relates to an inductor core, an electronic pen core portion, an electronic pen, and an input device.

BACKGROUND

For an input device that detects a position in a tablet or a display provided with a position detection sensor and inputs position information to a personal computer (PC), a smartphone, and the like, an electronic pen is used to indicate the position on the position detection sensor.

The Detection between the position detection sensor and the electronic pen is enabled with the position detection device, through transmission and reception of a position detection signal by a coupling method such as an electromagnetic inductive coupling method or an electrostatic inductive coupling method (for example, WO 2017/183526 A1 (Patent Literature 1)).

The electronic pen used in such an input device includes an inductor core configured by disposing a magnetic material such as ferrite around a core member of the electronic pen.

SUMMARY

An inductor core according to the disclosure includes a tubular magnetic material body formed of a magnetic material, including pores, the tubular magnetic material body including an inclined portion including an inclined surface which constitutes a peripheral surface of a truncated cone having an outer diameter that increases from one end toward the other end of the tubular magnetic material body; and a straight trunk portion which is disposed coaxially with the inclined portion, includes an outer peripheral surface which constitutes a peripheral surface of a cylindrical body extending from the other end toward the one end of the tubular magnetic material body, and is connected with the inclined portion, a difference between an average value of distances between centers of gravity of the pores in the inclined portion and an average diameter of the pores in the inclined portion, being smaller than a difference between an average value of the distances between centers of gravity of the pores in the straight trunk portion and an average diameter of the pores in the straight trunk portion.

An electronic pen core portion according to the disclosure includes the inductor core described above, and a core member which is inserted into the inductor core such that a tip portion of the core member protrudes from one end of the inductor core.

An electronic pen according to the disclosure includes a housing provided with an opening, and the electronic pen core portion described above, the electronic pen core portion being housed in the housing such that the tip portion of the electronic pen core portion can protrude or protrudes from the opening of the housing.

An input device according to the disclosure includes the electronic pen described above, and the position detection device including a sensor that detects a position which the electronic pen is approaching.

BRIEF DESCRIPTION OF DRAWINGS

Other and further objects, features, and advantages of the invention will be more explicit from the following detailed description taken with reference to the drawings wherein.

DETAILED DESCRIPTION

Hereinafter, an inductor core according to the disclosure will be described in detail with reference to the drawings.

Figure 1:
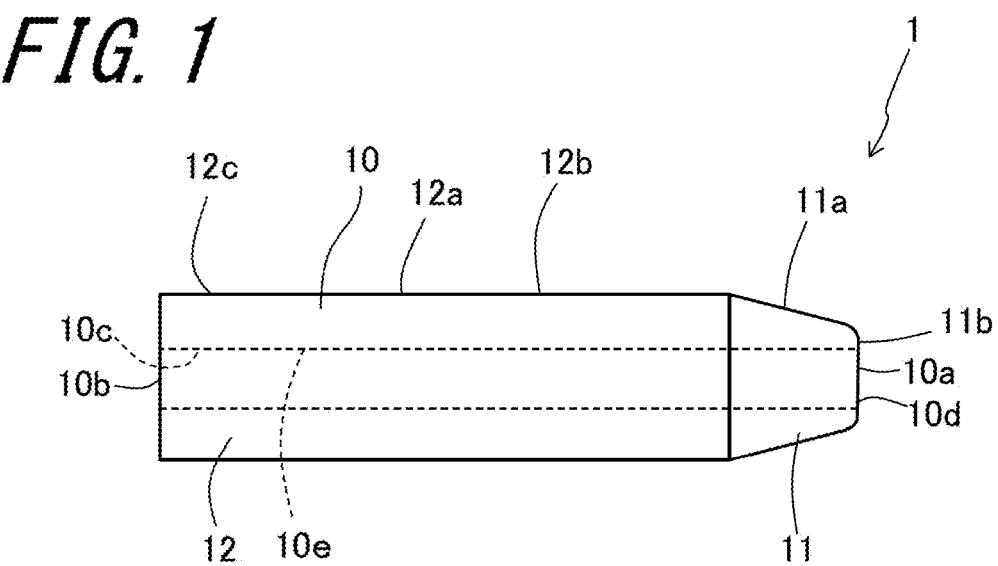
FIG. 1 is a plan view showing an example of an inductor core according to a first embodiment.
Figure 2:
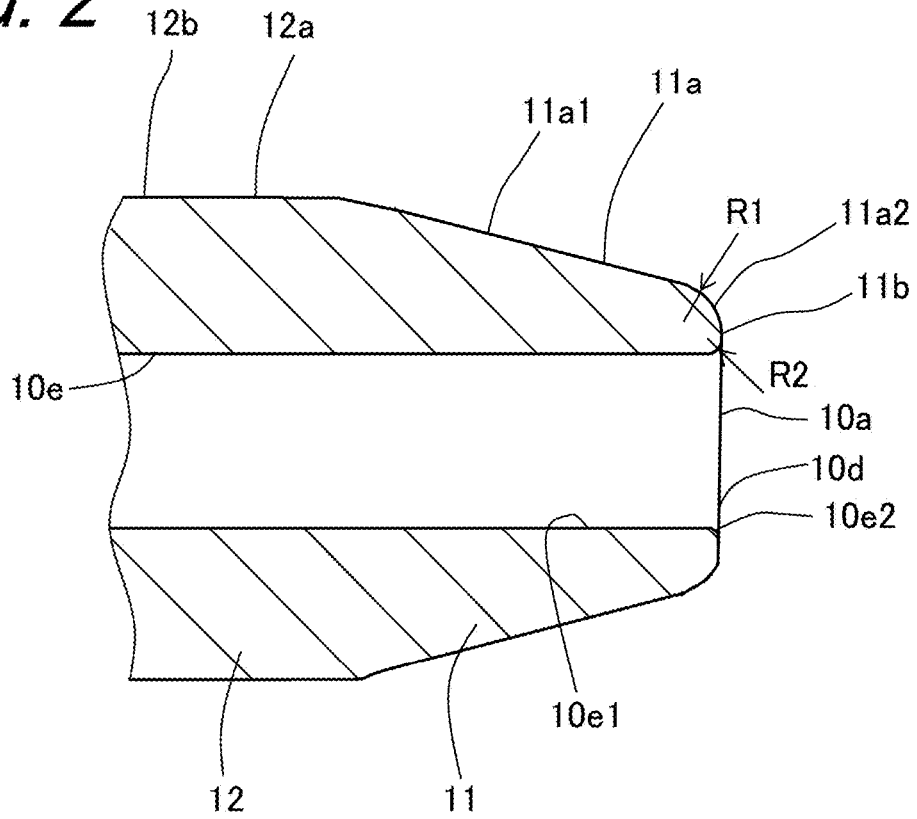
FIG. 2 is a partial cross-sectional view showing an example of the inductor core according to the first embodiment.

FIG. 1 is a plan view showing an example of an inductor core according to a first embodiment. FIG. 2 is a partial cross-sectional view showing an example of the inductor core according to the first embodiment. An inductor core 1 includes a magnetic material body 10 formed of a magnetic material such as ferrite sintered body.

The inductor core 1 is formed of a tubular magnetic material body 10 formed of a magnetic material and includes a cylindrical hole 10c penetrating from one end 10a to the other end 10b. For the magnetic material which constitutes the magnetic material body 10, for example, since powdery or granular ferrite or the like that are sintered are used, a multiplicity of pores are present in the magnetic material body 10. The magnetic material body 10 includes an inclined portion 11 including an inclined surface 11a which constitutes a peripheral surface of a truncated cone having an outer diameter that increases from the one end 10a toward the other end 10b, and a straight trunk portion 12 which is disposed coaxially with the inclined portion 11, includes an outer peripheral surface 12a of a cylindrical body extending from the other end 10b toward the one end 10a, and is connected with the inclined portion 11.

The length from the one end 10a to the other end 10b of the magnetic material body 10 is about 5 mm to 15 mm, and the diameter of the cylindrical hole 10c is about 0.5 mm to 2.0 mm, for example. The length of the straight trunk portion 12 is about 3 mm to 12 mm, and the outer diameter of the straight trunk portion 12 is about 2.0 mm to 3.0 mm. The length of the inclined portion 11 is about 0.5 mm to 2.0 mm, and the outer diameter of the inclined portion 11 on the side of the one end 10a is about 1 mm to 2 mm, and the outer diameter of the inclined portion 11 at the opposite side to the one end 10a is substantially the same as the outer diameter of the straight trunk portion 12. As described above, the inclined portion 11 is tapered toward the one end 10a.

In the cross section along a central axis of the magnetic material body 10, the outer diameter of the inclined portion 11 increases from the one end 10a toward the other end 10b. That is, the inclined portion 11 is tapered toward the one end 10a. The inclined surface 11a may include an inclined surface 11a1 which is a linear portion in a cross-sectional view, and a rounded inclined surface 11a2. At this time, the inclined surface 11a1 may form a peripheral surface of a truncated cone. Further, the inclined surface 11a in the vicinity of the one end 10a is a convex curved surface. That is, the inclined surface 11a1 of the inclined portion 11 and an end surface 11b of the inclined portion 11 may be connected to each other at the inclined surface 11a2 that is a part of the inclined surface 11a and that is a curved surface in a convex shape.

As described above, since the inclined surface 11a1 and the end surface 11b are connected to each other by the inclined surface 11a2 which is the convex curved surface, the possibility of damage may be reduced when, for example, the end surface 11b of the inclined portion 11 comes into contact with the housing of the electronic pen. Further, when the electronic pen is tilted and brought into contact with the surface of a tablet or the like, in addition to the core member, the tip including the one end 10a of the magnetic material body 10 may also come into contact with the tablet or the like, but because the inclined surface 11a1 and the end surface 11b of the inclined portion 11 are connected by the inclined surface 11a2 which is the convex curved surface, there is no presence of a pointed portion, and it is thus possible to reduce the possibility of damaging the surface of the tablet or the like by the inductor core 1.

For an inner peripheral surface 10e of the cylindrical hole 10c of the magnetic material body 10, the inner peripheral surface 10e near an opening 10d at the inclined portion 11 side may be rounded. The inner peripheral surface 10e may include an inner peripheral surface 10e1 and an inner peripheral surface 10e2 that is a convex curved surface and that connects the inner peripheral surface 10e1 and the end surface 11b of the inclined portion 11. When the inner peripheral surface 10e1 of the cylindrical hole 10c and the end surface 11b of the inclined portion 11 are connected to each other by the inner peripheral surface 10e2 which is a convex curved surface, because the concentration of stress may be reduced and the possibility of damaging the magnetic material body 10 may be reduced when, for example, the core member is pressed against the surface of the tablet or the like, the inductor core 1 having high reliability may be realized.

In the cross section along the central axis of the magnetic material body 10, when the radius of curvature of the inclined surface 11a2 which connects the inclined surface 11a1 of the inclined portion 11 and the end surface 11b of the inclined portion 11 is R1, and the radius of curvature of the inner peripheral surface 10e2 which connects the inner peripheral surface 10e1 of the cylindrical hole 10c and the end surface 11b of the inclined portion 11 is R2, the radius of curvature R1 of the inclined surface 11a2 may be greater than the radius of curvature R2 of the inner peripheral surface 10e2. The radius of curvature R1 of the inclined surface 11a2 is 0.1 mm to 0.2 mm, for example, and the radius of curvature R2 of the inner peripheral surface 10e2 is 0.02 mm to 0.08 mm, for example.

Figure 3:
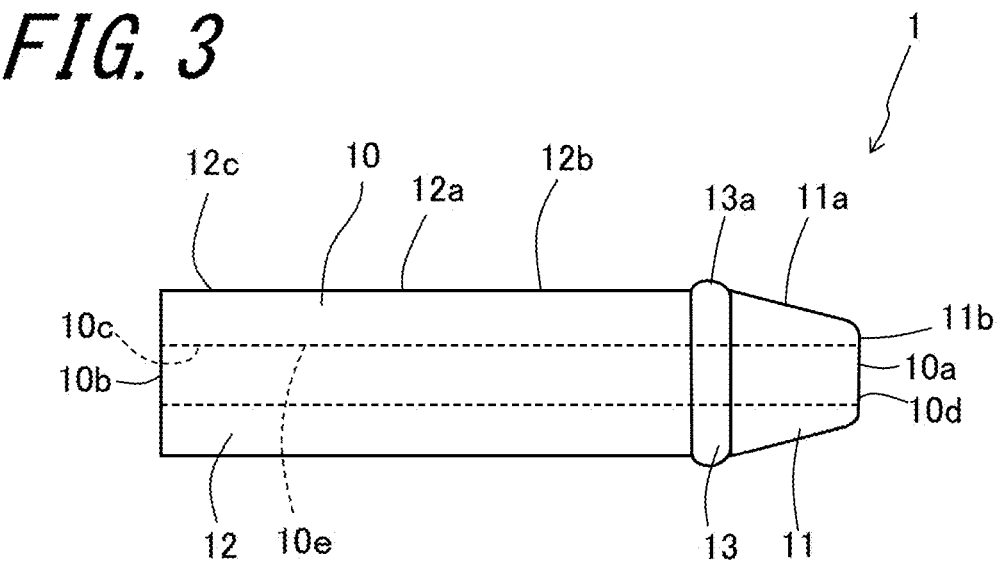
FIG. 3 is a plan view showing an example of an inductor core according to a second embodiment.

FIG. 3 is a plan view showing an example of an inductor core according to a second embodiment. The difference from the inductor core 1 of the first embodiment is that the straight trunk portion 12 and the inclined portion 11 are connected to each other with a flange portion 13. The magnetic material body 10 includes the inclined portion 11 including the inclined surface 11a which constitutes a peripheral surface of the truncated cone having the outer diameter that increases from the one end 10a toward the other end 10b, the straight trunk portion 12 which is disposed coaxially with the inclined portion 11, and constitutes the outer peripheral surface 12a of the cylindrical body that extends from the other end 10b toward the one end 10a, and the flange portion 13 which is provided between the inclined portion 11 and the straight trunk portion 12 and connects the inclined portion 11 and the straight trunk portion 12. The inclined portion 11, the flange portion 13 and the straight trunk portion 12 are arranged in this order from the one end 10a toward the other end 10b, and an outer peripheral surface 13a of the flange portion 13 has a greater outer diameter than the outer diameter of each of the inclined surface 11a of the inclined portion 11 and the outer peripheral surface 12a of the straight trunk portion 12.

For example, when the outer diameter of the straight trunk portion 12 except the flange portion 13 is 2.1 mm to 2.5 mm, the maximum value of the outer diameter of the outer peripheral surface 13a of the flange portion 13 is 2.12 mm to 2.72 mm, and it protrudes from the outer peripheral surface 12a of the straight trunk portion 12 by a maximum of 0.02 mm to 0.22 mm. Since the flange portion 13 allows the straight trunk portion 12 to be less likely to be deformed, even when a force is applied to the inclined portion 11 to deform the inclined portion 11, the deformation of the straight trunk portion 12 may be reduced.

The inductor core 1 illustrated in the first and second embodiments as described above is used by inserting a core member described below into the cylindrical hole 10c. The core member is inserted such that the tip portion of the core member is on the side of the one end 10a of the magnetic material body 10. Since the inclined portion 11 has a tapered shape, the one end 10a of the magnetic material body 10 may be brought closer to a position detection device such as a tablet that detects the position by an electromagnetic induction method or otherwise. As described above, by forming the inclined portion 11 of the magnetic material body 10 in a tapered shape, the accuracy of the position detection of the position detection device is improved. Further, since the tip portion of the magnetic material body 10 is tapered, the inclined portion 11 is configured to be easily displaced when the core member is displaced by the force applied to the tip portion of the core member.

Further, since the magnetic material body 10 which constitutes the inductor core 1 of the first and second embodiments described above is a sintered body, the magnetic material body includes a multiplicity of pores therein. When evaluating the distribution of these pores by distances between centers of gravity thereof, by the configuration in which a difference between an average value of the distances between the centers of gravity of the pores in the inclined portion 11 and an average diameter of the pores in the inclined portion 11 is smaller than the difference between the average value of the distances between the centers of gravity of the pores in the straight trunk portion 12 and the average diameter of the pores in the straight trunk portion, the inclined portion 11 of the magnetic material body 10 is likely to be deformed according to the deformation of the core member, and the straight trunk portion 12 of the magnetic material body 10 is less likely to be deformed.

While the inductor core 1 is used by inserting the core member into the magnetic material body 10, at the time of use, the core member is pressed against a tablet or the like and is applied to the tip portion thereof. In such a case, since the inclined portion 11 is more likely to be deformed than the straight trunk portion 12 with respect to an external force, the inclined portion 11 of the inductor core is likely to be deformed according to the deformation of the core member that is inserted in the inductor core, such that the inductor core is less likely to be damaged, and accordingly, a highly reliable inductor core may be realized.

Further, a configuration may also be provided, in which the difference between the average value of the distances between the centers of gravity of the pores in a vicinity 12c of the other end of the straight trunk portion 12 and the average diameter of the pores in the straight trunk portion 12 is greater than the difference between the average value of the distances between the centers of gravity of the pores in the central portion 12b of the straight trunk portion and the average diameter of the pores in the straight trunk portion 12. With such a configuration, the density in the vicinity 12c of the other end 10b of the straight trunk portion 12 is increased, so that the magnetic permeability is increased and the sensitivity is improved. Further, when the coil is wound around the outer periphery in the vicinity 12c of the other end 10b of the straight trunk portion 12, the number of pores per unit area is small, so that degranulation may be reduced.

Figure 4:
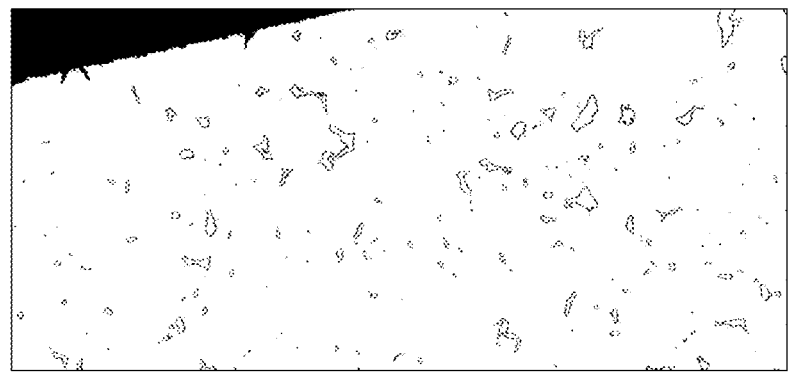
FIG. 4 is a microscopic photograph showing a cross section of an inclined portion of the inductor core.
Figure 5:
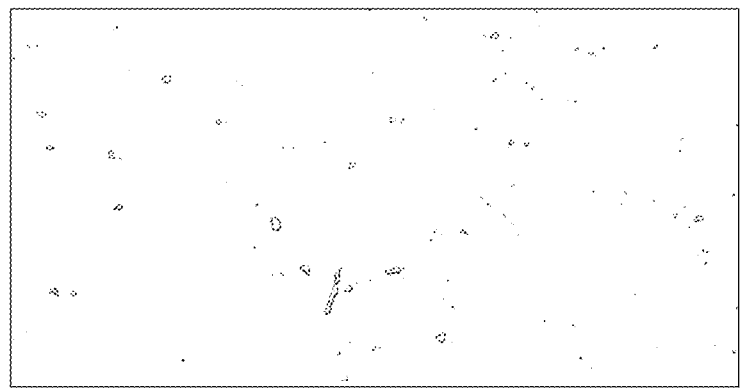
FIG. 5 is a microscopic photograph showing a cross section near a central portion of a straight trunk portion of the inductor core.
Figure 6:
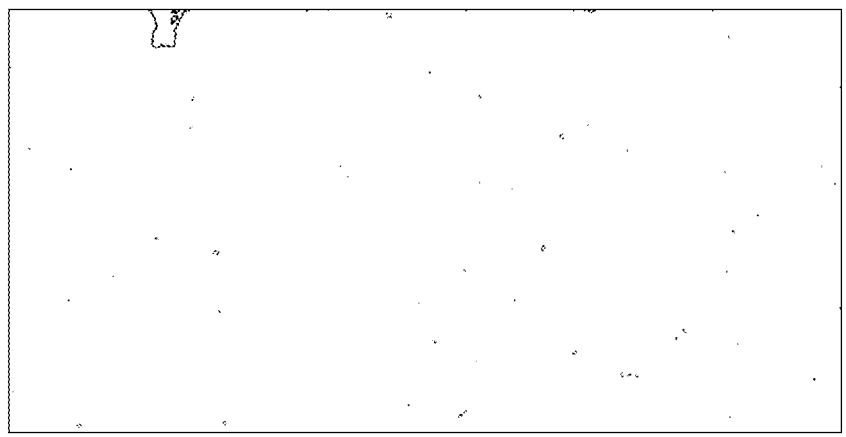
FIG. 6 is a microscopic photograph showing a cross section in the vicinity of the other end of the inductor core.

For the measurement of the distance between the centers of gravity of the pores, a measurement object is a mirror plane that is obtained by polishing the cut surfaces along the axial direction of the straight trunk portion 12 and the inclined portion 11 with diamond abrasive grains, such as the microscopic photographs shown in FIGS. 4 to 6, for example. FIG. 4 is a microscopic photograph showing a cross section of the inclined portion, FIG. 5 is a microscopic photograph showing a cross section near the central portion of the straight trunk portion, and FIG. 6 is a microscopic photograph showing a cross section in the vicinity of the other end of the straight trunk portion. In FIGS. 4 to 6, the areas surrounded by the curved lines, and the dot-like portions represent the pores. As described above, the porosity decreases from the inclined portion 11 toward the other end 10b of the straight trunk portion 12.

From the cut surfaces, regions where the size and distribution of pores are observed on average are selected from the inclined portion 11, the central portion 12b of the straight trunk portion 12 and the vicinity 12c of the other end of the straight trunk portion 12, respectively, and the distances between the centers of gravity are measured by the image analysis software "A-ZO KUN" (registered trademark, manufactured by Asahi Kasei Engineering Co., Ltd., hereinafter simply referred to as "image analysis software"), with the images of the area of $3.4 \times 10^5$ μm$^2$ (for example, the horizontal length is 680 μm, the vertical length is 500 μm) in the selected regions as the observation object. Further, the equivalent circular diameter of the pores is measured by particle analysis of the image analysis software with the image described above as an observation object. The distance between the centers of gravity of the pores and the equivalent circular diameter may be measured by considering the pores of the image as the particles. After setting the brightness of the setting conditions of the image analysis software to LOW, the binarization method to MANUAL, the threshold value to 60 to 80, the small figure elimination area to 0.1 μm$^2$, and a noise elimination filter to ON, analysis is performed using the image analysis software under these analysis conditions. By this analysis, the distances between the centers of gravity of the pores and the equivalent circular diameters are obtained, and the average values of these values are calculated, respectively, to obtain the average value of the distances between the centers of gravity and the average value of the circle equivalent diameters.

Note that, in the measurement described above, although the threshold value is set to 60 to 80, the threshold value may be adjusted according to the brightness of the image within the observation range, and after setting the brightness of the particles to LOW, the binarization method to MANUAL, the small figure elimination area to 0.1 μm$^2$, and the noise elimination filter to ON, the threshold may be adjusted so that the markers appearing in the image match the shapes of the pores.

Figure 7:
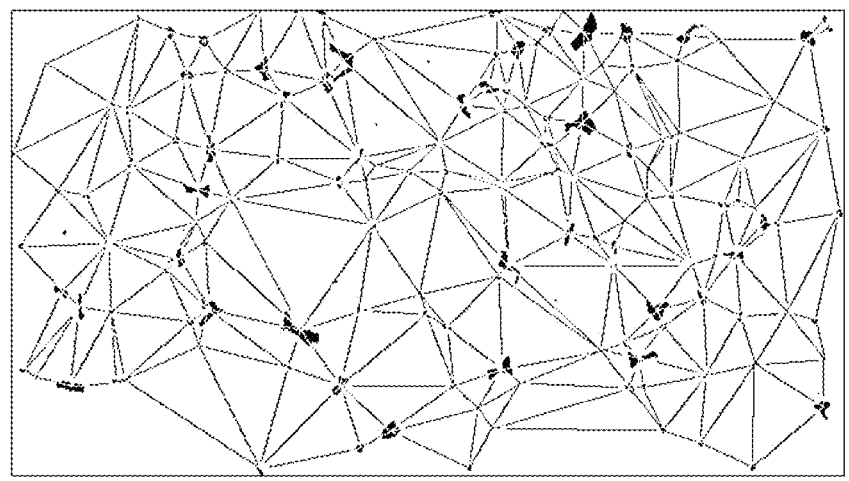
FIG. 7 is a photograph showing an analysis result of a distance between centers of gravity of pores in the cross section of the inclined portion of the inductor core.
Figure 8:
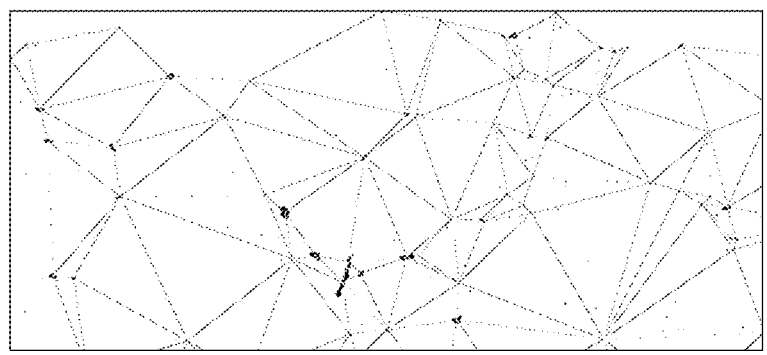
FIG. 8 is a photograph showing an analysis result of a distance between the centers of gravity of the pores in the cross section near the central portion of the straight trunk portion of the inductor core.
Figure 9:
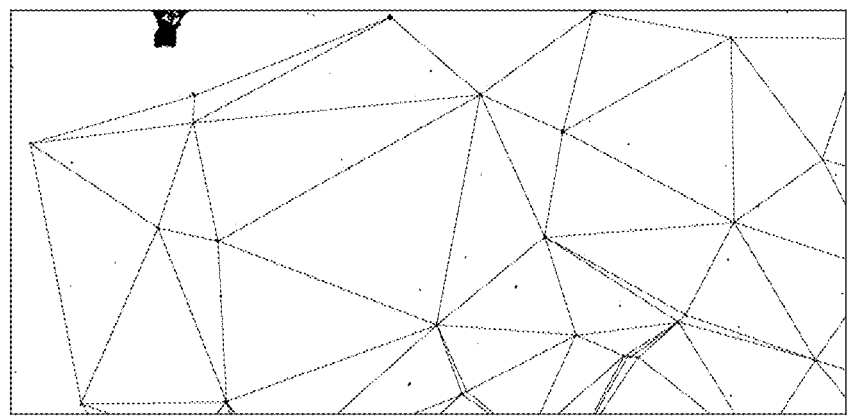
FIG. 9 is a photograph showing an analysis result of a distance between the centers of gravity of the pores in the cross section in the vicinity of the other end of the straight trunk portion of the inductor core.

FIG. 7 is a photograph showing a analysis result of a distance between the centers of gravity of the pores in the cross section of the inclined portion of the inductor core, FIG. 8 is a photograph showing an analysis result of a distance between the centers of gravity of the pores in the cross section near the central portion of the straight trunk portion of the inductor core, and FIG. 9 is a photograph showing an analysis result of a distance between the centers of gravity of the pores in the cross section near the other end of the straight trunk portion of the inductor core. In FIGS. 7 to 9, the pores are indicated by the black areas in the drawings. The straight lines shown in these photographs are straight lines connecting the centers of gravity of the adjacent pores. The center of gravity of the pore is the position of the center of gravity of the area of each pore in the cross section to be analyzed. It can be seen that the straight trunk portion 12 (FIGS. 8 and 9) has longer straight lines connecting the pores than those of the inclined portion 11 (FIG. 7). Further, it can be seen that, in the straight trunk portion 12, the vicinity 12c of the other end has the longer straight lines connecting the pores than those of the central portion 12b, and the other end 10b side of the magnetic material body 10 has the longer distances between the centers of gravity than those of the one end 10a side of the magnetic material body 10.

TABLE 1

|  | Inclined portion | Straight trunk portion (Central portion) | Straight trunk portion (Vicinity of other end) |
|---|---|---|---|
| Area ratio of pores (%) | 1.9 | 0.4 | 0.1 |
| Equivalent circular diameter (μm) | 3.33 | 2.32 | 1.66 |
| Distance between the centers of gravity (μm) | 40.24 | 50.59 | 73.13 |
| Distance between the centers of gravity - Equivalent circular diameter (μm) | 36.91 | 48.28 | 71.47 |

Referring to Table 1, the difference between the average value of the distances between the centers of gravity of the pores in the inclined portion 11 and the average diameter of the pores in the inclined portion 11 is 36.91 μm, the difference between the average value of the distances between the centers of gravity of the pores in the central portion 12b of the straight trunk portion 12 and the average diameter of the pores in the central portion of the straight trunk portion 12 is 48.28 μm, and the difference between the average value of the distance between the centers of gravity of the pores in the vicinity 12c of the other end of the straight trunk portion 12 and the average diameter of the pores in the vicinity of the other end of the straight trunk portion 12 is 71.47 μm. For this reason, it can be said that the difference between the average value of the distances between the centers of gravity of the pores in the inclined portion 11 and the average diameter of the pores in the inclined portion 11 is smaller than the difference between the average value of the distances between the centers of gravity of the pores in the straight trunk portion 12 and the average diameter of the pores in the straight trunk portion 12. Therefore, it can be said that the inclined portion 11 has a higher flexibility than the straight trunk portion 12, and the straight trunk portion 12 has a higher rigidity than the inclined portion 11.

In addition, the average diameter of the pores of the magnetic material body 10 may be 5 μm or less. When the average diameter of the pores is within this range, the pores are small and the periphery thereof is less likely to be a starting point of fracture, so that the inductor core 1 having high mechanical strength and fracture toughness may be provided.

The apparent porosity of the magnetic material body 10 was measured by the Archimedes method, and the result was 0.25%. The apparent porosity may be 1.5% or less, and by setting the apparent porosity within this range, the magnetic material body 10 can be more dense, and accordingly, the inductor core 1 having high mechanical strength and fracture toughness can be obtained. The apparent porosity is a value defined by JIS C 2141:1992.

The magnetic material body 10 is formed of ceramics which includes oxides of Fe, Zn, Ni, and Cu, and contains ferrite as a main component, and a coefficient of variation CV of average crystal grain sizes of the ceramics expressed by the following formula (1) may be 0.08 or more and 0.3 or less:

$$CV = \sigma/x \quad (1)$$

where, x is an average value of the average crystal grain sizes of the ceramics, and σ is a standard deviation of the average crystal grain sizes of the ceramics.

When the coefficient of variation CV is 0.08 or more, the grain size of the crystal grains varies appropriately, and small crystal grains are arranged among large crystal grains, thereby increasing the fracture toughness. When the coefficient of variation CV is 0.3 or less, the ratio of crystal grains having a large grain size with respect to the standard deviation increases, and the magnetic permeability is thereby increased. When the coefficient of variation CV is 0.08 or more and 0.3 or less, both high fracture toughness and high permeability may be achieved.

In particular, the coefficient of variation CV is preferably 0.1 or more and 0.2 or less.

In this example, the average crystal grain size may be obtained as follows.

First, the fractured surface of the inductor core 1 is polished with a copper disk using diamond abrasive grains having an average particle diameter $D_{50}$ of 3 μm, and then is ground on a tin disk using diamond abrasive grains having an average particle diameter $D_{50}$ of 0.5 μm. The polished surface obtained by these polishing is etched at a temperature of 950° C. until the crystal grains and the grain boundary layer may be distinguished from each other so that an observation surface is obtained.

Within a range of 155 μm×115 μm of the observation surface at 5000× magnification with a scanning electron microscope, six straight lines of the same length of 100 μm, for example, are drawn around any point radially, and the lengths of these six straight lines are divided by the number of crystals present on each line, so that the average crystal grain size can be obtained.

Figure 13:
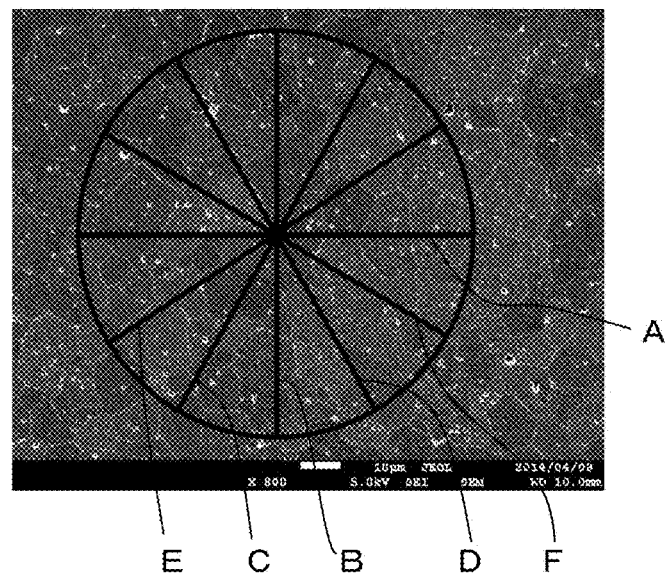
FIG. 13 is a photograph showing an example of an observation surface of the inductor core and how the straight lines are drawn.

FIG. 13 is a photograph showing an example of the observation surface of the inductor core and how the straight lines are drawn. The straight lines A to F shown in FIG. 13 are straight lines each having a length of 100 μm, and the average crystal grain size may be obtained using these straight lines. The average value, standard deviation, and coefficient of variation CV of the average crystal grain sizes may be calculated for each of 42 average crystal grain sizes by selecting 7 such observation surfaces.

Further, a kurtosis Ku of the average crystal grain sizes may be 0 or more.

When the kurtosis Ku of the average crystal grain sizes is within this range, since the variation of the grain size of the crystal grain is suppressed, the agglomeration of the pores is reduced, and it is thus possible to reduce the degranulation from the contour or the inside of the pores. Particularly, the kurtosis of the average crystal grain sizes is preferably 1 or more.

Here, the kurtosis Ku is an index (statistic) indicating how much the peak and tail of the distribution differ in the normal distribution, in which when the kurtosis Ku>0, the distribution has a sharp peak, when the kurtosis Ku=0, the distribution is normal, and when the kurtosis Ku<0, the distribution has a rounded peak.

The kurtosis Ku of the average crystal grain sizes may be obtained by using a function Kurt provided in Excel (registered trademark, Microsoft Corporation).

Further, a skewness Sk of the average crystal grain sizes may be 0 or more.

When the skewness Sk of the average crystal grain sizes is within the above range, since the distribution of the grain size of the crystal grains is moving in the direction of the smaller grain size, the agglomeration of the pores is reduced, and it is thus possible to further reduce the degranulation from the contour or the inside of the pores.

Here, the skewness Sk is an index (statistic) indicating how much the distribution is distorted from the normal distribution, that is, the left-right symmetry of the distribution, in which, when the skewness Sk>0, the tail of the distribution moves to the right side, when the skewness Sk=0, the distribution is symmetrical, and when the skewness Sk<0, the tail of the distribution is moved to the left side.

The skewness Sk of the average crystal grain sizes may be obtained by using the function SKEW provided in Excel (registered trademark, Microsoft Corporation).

At least the inclined portion 11 may contain Mo, which is contained more in a grain boundary layer than in crystal grains.

When Mo is contained more in the grain boundary layer than in the crystal grains, since the binding force between the crystal grains containing ferrite as a main component is reduced, the inclined surface 11a2 having a large radius of curvature R1 may be easily obtained.

The Mo content in the crystal grains and in the grain boundary layer may be subjected to elemental analysis by using a transmission electron microscope and an energy dispersive X-ray spectrometer (EDS) attached to the transmission electron microscope.

The magnetic material body 10 used for the inductor core 1 may be manufactured as follows. First, as starting materials, oxides of Fe, Zn, Ni and Cu, or metal salts such as carbonates and nitrates for producing oxides by firing are prepared. Here, the average particle diameter thereof is 0.5 µm or more and 5 µm or less, respectively, when Fe is iron oxide ($Fe_2O_3$), Zn is zinc oxide (ZnO), Ni is nickel oxide (NiO) and Cu is copper oxide (CuO), for example.

Subsequently, in producing a first raw material formed of a calcined powder containing $Fe_2O_3$—ZnO—NiO and a second raw material formed of a calcined powder containing $Fe_2O_3$—CuO, iron oxide, zinc oxide, and nickel oxide are weighed in desired amounts for the first raw material. For the second raw material, iron oxide and copper oxide are weighed in desired amounts. In the example, regarding the addition amount of iron oxide in the production of the first raw material and the second raw material, the amount of iron oxide added in the production of the second raw material is equimolar in percentage to that of copper oxide, and the remaining amount is used in the production of the first raw material.

Then, the powders weighed for the first raw material and the second raw material are pulverized and mixed with different ball mills or vibration mills, respectively, and then are calcined in a reducing atmosphere at 750° C. for 2 hours or longer in the production of the first raw material and in a reducing atmosphere at 650° C. for 2 hours or longer in the production of the second raw material, respectively to obtain a calcined body, respectively.

Next, the calcined bodies to be the first raw material and the second raw material are put into separate ball mills or vibration mills and pulverized to obtain the first raw material and the second raw material formed of the calcined powder. Here, particularly, the calcined body as the second raw material is pulverized so that the average particle diameter D50 is 0.7 µm or less. Then, the first raw material and the second raw material are weighed and mixed in a desired amount, and then recalcined in the atmosphere under the conditions of 600° C. or higher and 700° C. or lower and a heating rate of 100° C./h or lower to obtain a calcined body synthesized into ferrite formed of oxides of Fe, Zn, Ni and Cu.

Next, the calcined body obtained by the re-calcination is put into a ball mill, a vibration mill, or the like and pulverized, is made into a slurry by adding a predetermined amount of binder or the like, and granulated by spraying the slurry using a spray dryer to obtain spherical granules.

Here, when obtaining the inductor core 1 in which at least the inclined portion 11 contains Mo, which is contained more in the grain boundary layer than in the crystal grains, with respect to 100 parts by mass of the calcined body obtained by the re-calcination, for example, 0.01 part by mass or more and 0.03 part by mass or less of a powder of molybdenum oxide ($MoO_3$) is added to form the slurry, and the slurry may be sprayed for granulation to obtain spherical granules.

Then, the obtained spherical granules are press-molded to obtain a molded body having a predetermined shape. A configuration may be realized, in which, at the time of this press-molding, more pressure is applied, by adjustment, to the straight trunk portion 12 side than the inclined portion 11 side, such that the distribution density of pores decreases from one end 10a toward the other end 10b of the magnetic material body 10. After that, the molded body is subjected to a degreasing treatment in a degreasing furnace in the range of 400° C. to 800° C. to obtain a degreased body, which is then held and fired in a firing furnace at a maximum temperature of 1000 to 1200° C. for 2 to 5 hours to form the magnetic material body 10, so that the inductor core 1 according to the present embodiment may be obtained.

Figure 10:
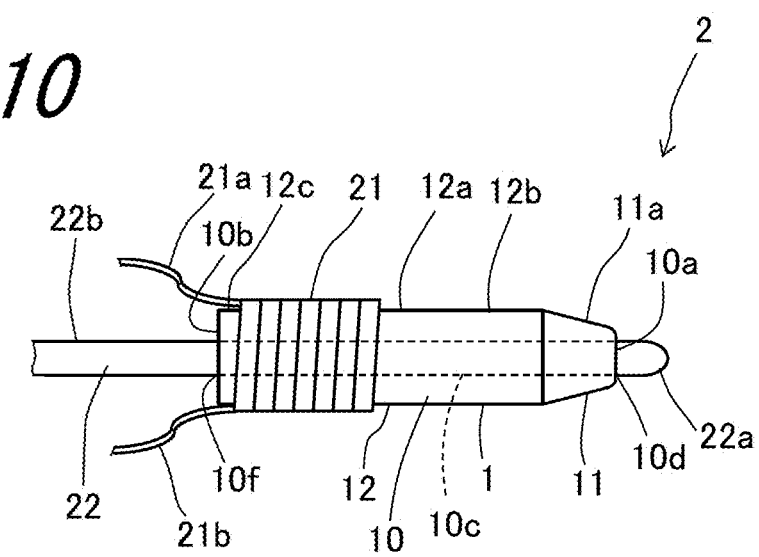
FIG. 10 is a plan view showing an example of an electronic pen core portion according to an embodiment.

FIG. 10 is a plan view showing an example of an electronic pen core portion according to an embodiment. The electronic pen core portion 2 includes the inductor core 1, a coil 21 wound around the magnetic material body 10 of the inductor core 1, and a core member 22 inserted into the cylindrical hole 10c of the magnetic material body 10. Such an electronic pen core portion 2 may be built in the electronic pen of the input device such as an electromagnetic induction type tablet.

The core member 22 may be formed of a metal rod such as SUS304 or SUS316 that is not likely to be magnetized, a metal material other than SUS, ceramics, or resin. Further, the core member 22 may be one that is capable of actually writing, such as a ballpoint pen core. The core member 22 is inserted into the cylindrical hole 10c of the magnetic material body 10 and fixed therein. The core member 22 is fixed in the magnetic material body 10 at a position such that the tip portion 22a protrudes from the opening 10d on the one end 10a side of the magnetic material body 10 by about 1 to 2 mm. The magnetic material body 10 has a tapered shape toward the tip portion 22a of the core member 22. In addition, a rear end portion 22b of the core member 22 protrudes from the opening 10f on the other end of the magnetic material body 10.

The coil 21 formed by winding an enamel wire or the like is arranged on the outer peripheral surface 12a of a region of the straight trunk portion 12 of the magnetic material body 10, which is close to the other end 10b. The coil 21 is wound with a width of about 8 mm to 12 mm around a portion of the straight trunk portion 12 of the magnetic material body 10, which is close to the other end 10b side, and fixed thereto. The terminals 21a and 21b of the coil 21 are connected to a circuit board (not shown).

When the electronic pen core portion 2 is brought into contact with the surface of a position detection device such as a tablet, a force is applied from the core member 22 to the magnetic material body 10. At this time, since the inclined portion 11 is likely to be deformed and the straight trunk portion 12 is formed such that it has the increased rigidity, and since the magnetic material body 10 is less likely to be damaged by the deformation and displacement of the core member 22 during use, it is possible to realize the electronic pen core portion 2 having high reliability.

Figure 11:
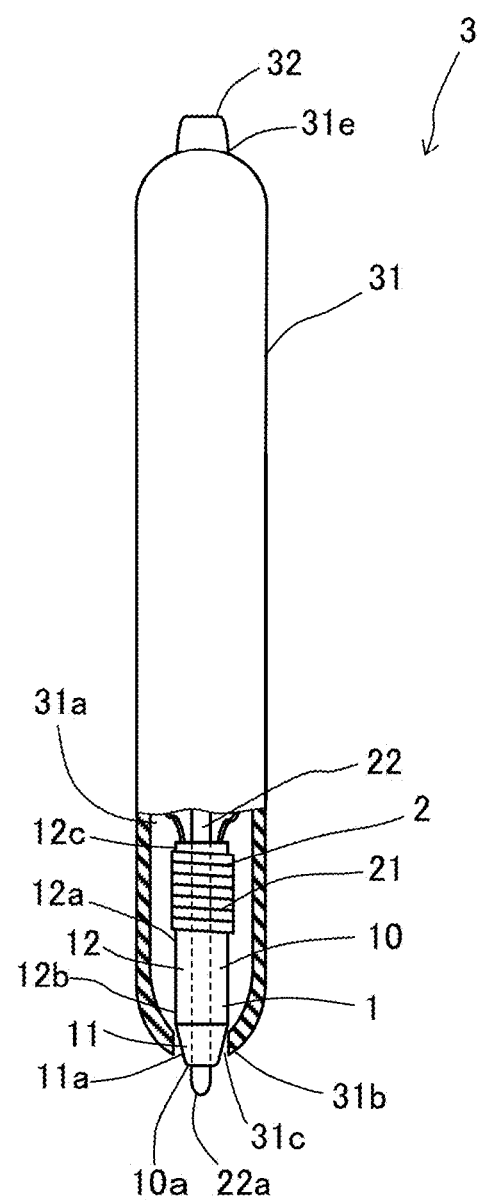
FIG. 11 is a plan view showing an example of an electronic pen according to an embodiment.

FIG. 11 is a plan view showing the electronic pen according to the present embodiment. An electronic pen 3 is shown with a part of the housing 31 thereof removed. The electronic pen core portion 2 is housed in the housing 31 to form the electronic pen 3. The electronic pen 3 is configured to house the electronic pen core portion 2 and the circuit board (not shown) in a hollow portion 31a of the tubular housing 31. Such an electronic pen 3 may be used as a position input means in the input device such as an electromagnetic induction type tablet. The tip portion 31b of the housing 31 is provided with an opening 31c through which the tip portion 22a of the core member 22 may protrude, and configured such that the tip portion 22a may protrude from the opening 31c or may be housed in the housing 31 by a knock mechanism.

For example, the rear end 31d of the housing 31 is provided with an opening 31e, and a knock rod 32 protrudes from the opening 31e. The user may press the knock rod 32 to move the tip portion 22a of the core member 22 into and out of the housing 31. While the tip portion 22a of the core member 22 is configured to be moved into and out of the opening 31c in this embodiment, the tip portion 22a of the core member 22 may be fixed in the state of protruding from the opening 31c, in which case the knock mechanism is unnecessary.

Since the tip portion 31b of the housing 31 is tapered, the outer periphery of the magnetic material body 10 and the inner surface of the housing 31 may come into contact with each other, but in such a case, since the inclined portion 11 is likely to be deformed and the straight trunk portion 12 is formed so as to have the increased rigidity, and since the possibility that the magnetic material body 10 is damaged by the deformation and displacement of the core member 22 during use can be reduced, it is possible to realize the electronic pen 3 having high reliability.

Figure 12:
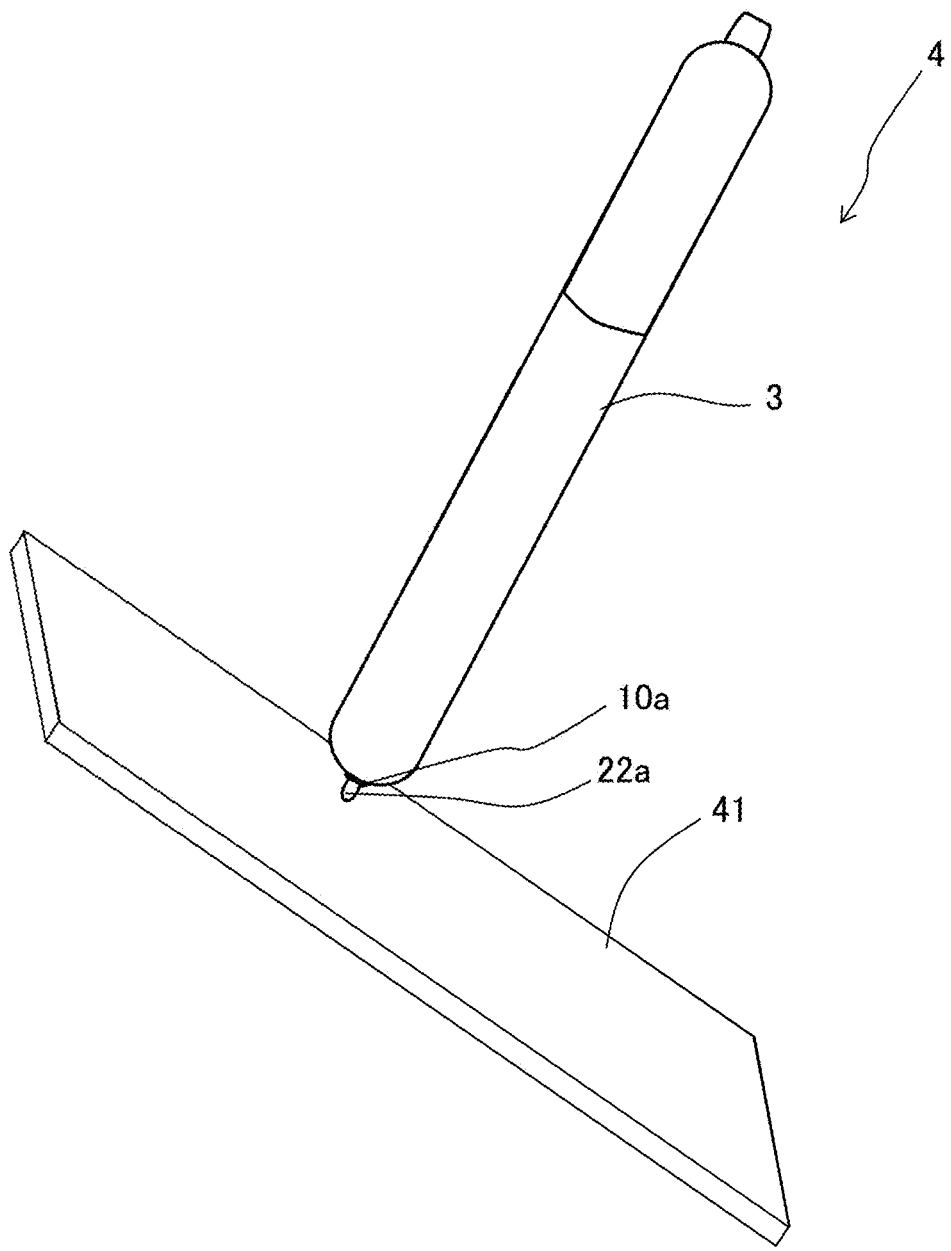
FIG. 12 is a perspective view showing an example of an input device according to an embodiment.

FIG. 12 is a perspective view showing an input device according to an embodiment. An input device 4 includes the electronic pen 3, and a tablet 41 that is a position detection device including a sensor that detects a position. The input device 4 may detect a position at which the tip portion 22a of the core member 22 comes into contact with the tablet 41. In addition to the tablet 41, the position detection device may be a mobile terminal equipped with a touch panel display, or the like. The electromagnetic induction may be used as the position detection method for the input device 4. In the electronic pen 3, even when the one end 10a of the magnetic material body 10 is configured to approach the tablet 41, since the inclined portion 11 is likely to be deformed and the straight trunk portion 12 is formed so as to have the increased rigidity, it is possible to realize the input device 4 having high reliability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Inductor core
2: Electronic pen core portion
3: Electronic pen
4: Input device
10: Magnetic material body
10a: One end
10b: Other end
11: Inclined portion
11a: Inclined surface
12: Straight trunk portion
12a: Outer peripheral surface
12b: Central portion
12c: Vicinity of other end

The invention claimed is:

1. An inductor core, comprising:
a tubular magnetic material body formed of a magnetic material, comprising pores,
the tubular magnetic material body comprising
an inclined portion comprising an inclined surface which constitutes a peripheral surface of a truncated cone having an outer diameter that increases from one end toward the other end of the magnetic material body; and
a straight trunk portion which is disposed coaxially with the inclined portion, comprises an outer peripheral surface which constitutes a peripheral surface of a cylindrical body extending from the other end toward the one end of the tubular magnetic material body, and is connected with the inclined portion,
a difference between an average value of distances between centers of gravity of the pores in the inclined portion and an average diameter of the pores in the inclined portion, being smaller than a difference between an average value of distances between centers of gravity of the pores in the straight trunk portion and an average diameter of the pores in the straight trunk portion.

2. The inductor core according to claim 1, wherein a difference between an average value of distances between centers of gravity of the pores in a vicinity of the other end of the straight trunk portion and the average diameter of the pores in the straight trunk portion, is greater than a difference between an average value of distances between centers of gravity of the pores in a central portion of the straight trunk portion and the average diameter of the pores in the straight trunk portion.

3. The inductor core according to claim 1, wherein an average diameter of the pores of the magnetic material body is 5 μm or less.

4. The inductor core according to claim 1, wherein an apparent porosity of the magnetic material body is 1.5% or less.

5. The inductor core according to claim 1, wherein the magnetic material body is formed of ceramics which comprises oxides of Fe, Zn, Ni and Cu, and comprises ferrite as a main component, and a coefficient of variation CV of average crystal grain sizes of the ceramics expressed by the following formula (1) is 0.08 or more and 0.3 or less:

$$CV = \sigma/x \tag{1}$$

where,
x is an average value of the average crystal grain sizes of the ceramics, and
σ is a standard deviation of the average crystal grain sizes of the ceramics.

6. The inductor core according to claim 5, wherein a kurtosis of the average crystal grain sizes is 0 or more.

7. The inductor core according to claim 5, wherein a skewness of the average crystal grain sizes is 0 or more.

8. The inductor core according to claim 5, wherein at least the inclined portion comprises Mo, which is contained more in a grain boundary layer than in crystal grains.

9. An electronic pen core portion, comprising:
the inductor core according to claim 1; and
a core member which is inserted into the inductor core such that a tip portion of the core member protrudes from one end of the inductor core.

10. An electronic pen, comprising:
a housing having an opening; and
the electronic pen core portion according to claim 9,
the electronic pen core portion being housed in the housing such that the tip portion of the electronic pen core portion can protrude or protrudes from the opening of the housing.

11. An input device, comprising:
the electronic pen according to claim 10; and
a position detection device comprising a sensor that detects a position which the electronic pen is approaching.

12. The inductor core according to claim 5, wherein the coefficient of variation CV of the average crystal grain sizes of the ceramics is 0.2 or less.

\* \* \* \* \*